US012489943B2

(12) United States Patent
Channapragada et al.

(10) Patent No.: US 12,489,943 B2
(45) Date of Patent: *Dec. 2, 2025

(54) METHODS AND SYSTEMS FOR DYNAMICALLY OPTIMIZING CONTENT FOR CONSUMPTION ON A SCHEDULED TRIP

(71) Applicant: Adeia Guides Inc., San Jose, CA (US)

(72) Inventors: Srikanth Channapragada, Bangalore (IN); Vikram Makam Gupta, Karnataka (IN); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,599

(22) Filed: Dec. 19, 2023

(65) Prior Publication Data
US 2024/0196046 A1    Jun. 13, 2024

Related U.S. Application Data

(63) Continuation of application No. 18/117,226, filed on Mar. 3, 2023, now Pat. No. 11,889,144, which is a continuation of application No. 17/379,038, filed on Jul. 19, 2021, now Pat. No. 11,622,148.

(51) Int. Cl.
*H04N 21/4335*    (2011.01)
*H04N 21/442*    (2011.01)
*H04N 21/45*    (2011.01)

(52) U.S. Cl.
CPC ... *H04N 21/4335* (2013.01); *H04N 21/44204* (2013.01); *H04N 21/4532* (2013.01)

(58) Field of Classification Search
CPC ......... H04N 21/4335; H04N 21/44204; H04N 21/4532
See application file for complete search history.

(56) References Cited

U.S. PATENT DOCUMENTS

| 9,299,116 | B2 * | 3/2016 | Williams | ............... G06Q 50/10 |
| 10,257,572 | B2 * | 4/2019 | Manus | ............. G06Q 10/06393 |
| 10,412,178 | B2 | 9/2019 | Nielsen et al. | |
| 10,484,494 | B2 | 11/2019 | Saito | |
| 10,531,239 | B1 | 1/2020 | Mccarty et al. | |
| 11,019,165 | B2 | 5/2021 | Saito | |
| 11,622,148 | B2 | 4/2023 | Channapragada et al. | |
| 2006/0135179 | A1 | 6/2006 | Aaltonen | |

(Continued)

*Primary Examiner* — Chenea Davis
(74) *Attorney, Agent, or Firm* — HALEY GUILIANO LLP

(57) ABSTRACT

Systems and methods are described herein for retrieving an information file from a user profile about a scheduled trip, where access to content may be restricted and identifying, based on the consumption pattern, a first progression point before the scheduled start time and a second progression point after the scheduled end time of the scheduled trip. Based on the difference between the first and second progression points, the media guidance application causes to be stored the respective media assets on a consumption device. Then before departing for the scheduled trip, the media guidance application confirms the first progression points against the current progression point and causes to adjust the stored media assets based on a difference between the current progression point and the first progression point.

20 Claims, 8 Drawing Sheets

(56) References Cited

U.S. PATENT DOCUMENTS

| | | |
|---|---|---|
| 2010/0153885 A1 | 6/2010 | Yates |
| 2011/0314502 A1 | 12/2011 | Levy et al. |
| 2013/0227068 A1 | 8/2013 | Yasrebi et al. |
| 2014/0092730 A1 | 4/2014 | Yang |
| 2018/0367861 A1 | 12/2018 | Sanghavi et al. |
| 2019/0208249 A1* | 7/2019 | Yegorov .......... H04N 21/25841 |
| 2020/0021661 A1 | 1/2020 | Nielsen et al. |
| 2021/0258395 A1 | 8/2021 | Saito |
| 2023/0013876 A1 | 1/2023 | Channapragada et al. |
| 2023/0209130 A1 | 6/2023 | Channapragada et al. |

* cited by examiner

METHODS AND SYSTEMS FOR DYNAMICALLY OPTIMIZING CONTENT FOR CONSUMPTION ON A SCHEDULED TRIP

CROSS REFERENCE TO RELATED APPLICATIONS

This application is a continuation of U.S. patent application Ser. No. 18/117,226, filed Mar. 3, 2023, which is a continuation of U.S. patent application Ser. No. 17/379,038, filed Jul. 19, 2021, the disclosures of which is hereby incorporated by reference herein in its entirety.

BACKGROUND

The present disclosure relates to methods and systems for storing content for a trip and, more particularly, to methods and systems for optimizing the amount of content to download for a trip based on the progress of consuming the programming.

SUMMARY

Frequent travelers may find themselves lacking movies and shows to watch based on geographical limitations. Although recommendations may be available, accessing them may be limited based on the content availability in a particular geographical area. For example, when traveling to a particular geographical area, the recommendations and content on a user watchlists may not be accessible. Moreover, a show or a series may only be available in a select number of episodes. There is not a correlation between where the user stopped watching a show or series and the available episodes. These systems provide a limited collection of content items for passengers to watch during transit and on vacation in some destinations, but often the user manually downloads some episodes of a show or a movie before departing for the trip. This also becomes less effective when the user watches some of the downloaded episodes on the consumer device before departing, which results in the user not having ample episodes to last the entire trip. For example, the user is interested in watching episodes of a show "Friends." If the user watches some episodes of "Friends" before departing for the trip, manually downloads additional episodes for the trip, but consumes part of the content before departing, he or she may not have anything else of interest to watch while on the trip. Moreover, the related art is limited to manual interactivity between the user and the program guide and is labor-intensive. Alternatively, the consumer device may download all episodes of a series and fill up the processing storage and memory of a consumption device. Thus, there is a need for the consumer device to be able to account for an upcoming scheduled trip, a consumption pattern and the viewing progress before the scheduled trip and to allow for adjustments to the stored content on the consumer device.

To overcome these problems, methods and systems are disclosed herein to ensure access to a playlist's streaming media based on the consumption pattern, progression point, and geographic content restrictions on the streaming media. The systems and methods described herein may receive information from a user profile. The information may include a scheduled trip and a consumption pattern. The scheduled trip may include a destination, a scheduled start time and a scheduled end time. The system may identify a first progression point within the presentation of a respective media asset of a plurality of media assets at the scheduled start time. For example, the consumer device associated with the user profile is consuming episode 2 of season 1 of "Friends" and identifies, based on the timeline and consumption pattern, that in one week (e.g., scheduled start time of trip), the progression point to which the user is likely to get before departing is up to episode 9 (i.e., up to episode 9). Based on identifying that the user is likely to consume episodes 2 through 8 including episode 8 before departing, the system may determine a second progression point in consuming the media asset (e.g., episodes of the show) during the scheduled trip. For example, the system may determine based on the consumption progress that the user is likely to consume a total of seven episodes before the trip and reach up to episode 15 while on the scheduled trip. Based on identifying the second progression point (e.g., the start of episode 15), the system causes the consumption device to store the respective media assets from the plurality of media assets between the first progression point and second progression point on the consumption device. For example, the system downloads and stores episodes 9 through 15 of "Friends" on the consumption device. Before departing, within a threshold time period (e.g., 1 hour, 12 hours, etc.) before the scheduled start time of the scheduled trip, the system may determine that the first progression point within the presentation of the respective media asset of the plurality of media assets has shifted to a third progression point. For example, the user has consumed additional episodes on the consumption device, and the current progression point is now up to the start of episode 10 and not episode 8 before departing for the trip. Based on determining that the first progression point (e.g., episode 8) has shifted to a third progression point (e.g., episode 10), the system causes the consumption device to store episodes 10 through 17 of "Friends." For example, the episodes that were presented on the consumption device (or any other device linked to the user profile) may be deleted, and additional episodes may be downloaded and stored on the device. The systems and methods described herein dynamically optimize the amount (e.g., number of episodes of a show) of media asset of the downloadable streaming media that is saved on the consumer device to ensure that the user can take the content with him and circumvent an inability to access the media asset while having an appropriate amount of content to last the duration of the trip.

In some embodiments, the system performs the steps described above or below automatically and without user input. For example, the system detects that a user is to travel to a different geographic area (e.g., by parsing the user's email or calendar to learn of a travel itinerary) and may automatically identify the consumption pattern of media assets using a consumption device and calculate, based on the media asset consumption pattern, the amount of time before the scheduled trip, and the duration of the scheduled trip, the expected duration of media assets expected to be consumed before the scheduled trip and accordingly downloads media assets for the duration of the scheduled trip and before the user departs for the trip. The system and method may further confirm before the trip that the consumption pattern and progression points of the media assets align with downloaded content.

In some embodiments, the system determines based on the consumption pattern media progression points before and during the scheduled trip. For example, the system determines that the user consumes an hour of content a day over a week. In some embodiments, the consumption pattern may be based on other criteria. The system further retrieves information about a scheduled trip indicated by the profile. The scheduled trip may include a scheduled start time and a scheduled end time. For example, the system determines that the user is traveling to Canada in 7 days for a seven-day stay. The system calculates based on the asset consumption pattern (e.g., 1 hour consumption rate) a first progression point of 7 hours of content and the duration (e.g., 7 days) of the scheduled trip (e.g., Canada) an expected duration of media assets expected to be consumed during the scheduled trip (e.g., 7 hours of content). For example, the system determines, based on the average watch time of 1 hour a day and the scheduled trip for 7 days, that the user is likely to consume 7 hours of content before departing and 7 hours of content while on the trip. Accordingly, the system downloads the show or series from where he or she is likely to be, based on the expected 7 hours of content to be consumed before departing and the 7 hours of content to be consumed while on the trip. The system may further determine before departing (e.g., 1 day before leaving) that the total play duration of media assets downloaded on the consumption device is adequate for the trip. In response to determining that the total play duration of media assets stored on the consumption device is less than the second progression point while on the trip, the system causes the consumption device to store additional media assets on the consumption device.

In some embodiments, the streaming media that the user enjoys watching is not available at the different geographic locations (e.g., due to geography-based content restrictions).

In some embodiments, systems and methods are described herein for optimizing downloaded media assets unavailable for a scheduled trip based on the expected duration of media assets expected to be consumed during the scheduled trip. For example, the media assets may be downloaded to the user's device based on the consumption pattern.

In some embodiments, the system causing to be stored the respective media assets from the plurality of media assets between the first progression point and second progression point on the consumption device includes identifying, based on a profile, a travel consumption pattern of media assets using the consumption device during a previous trip. For example, the system determines that the consumer watched 10 hours of content during the last 7 days. Based on the travel consumption pattern, the system determines a travel media asset consumption rate. For example, such a consumption rate indicates the consumer's viewing pattern when on a trip. Based on the travel media asset consumption rate and the scheduled trip duration, the system then calculates the expected duration of media assets expected to be consumed during the trip. In some embodiments, the system may collect data about the destination of the previous trip and may determine the consumption pattern associated with a destination.

In some embodiments, the system further identifies, based on the profile, a non-travel consumption pattern, for example, a consumption pattern while the user is not traveling and is at home. The system then determines, based on the time between the date of the previous trip and the scheduled trip, a correlation factor. The correlation factor is skewed towards the non-travel consumption pattern based on the length of time from the date of the previous trip. For example, the older the previous trip is, the less weight is given to the travel consumption pattern during the previous trip. In response to the travel consumption pattern, the non-travel consumption pattern and the correlation factor, the system determines the consumption rate of media assets using consumption device In some embodiments, the travel consumption pattern and the non-travel consumption pattern are averaged to determine the consumption rate.

In some embodiments, the system identifies the scheduled trip indicated by the profile by analyzing a calendar of a user to identify an out-of-office notification. The system accesses an email database to identify an electronic communication that is addressed to the user of the profile—searching the electronic communications for indications of scheduled travel accommodations to identify the scheduled trip. The system may access calendar data associated with the profile in order to determine the particular time period. For example, calendar data may identify an arrival time at a location and a departure time from the location. As another example, calendar data may identify flight information, including scheduled departure and arrival times. The system defines the particular time period based on the calendar data.

In some embodiments, the media assets stored on the consumption device include media assets added to a watchlist. In some embodiments, the media assets stored on the consumption device are part of a series that the user is consuming. For example, a user starts watching a series (e.g., "Friends") and wants to continue to watch episodes of the series while on a scheduled trip. In some embodiments, based on the progression point of the series upon identifying the scheduled trip, the system may estimate the consumer's progress by the scheduled trip (i.e., how many shows the user will have watched before leaving) and the expected amount of content to be consumed on the scheduled trip (i.e., how many shows the user will watch on the trip). For example, a user is on season 1, episode 4 of "Friends," with a week to go until his or her trip to Canada; the user is consuming an average of 2 episodes (e.g., 60 minutes) a day: therefore, the system determines that user will consume 7 episodes (e.g., 3.5 hours) of the series "Friends" and will be at episode 11 before the scheduled trip to Canada, where the show "Friends" is not available. The system will then determine that the consumer will need approximately another 7 episodes (e.g., 3.5 hours) of the series "Friends," from episode 12 to episode 18 and causes the consumption device to store the episodes on the consumption device. Thus, the expected duration of media assets expected to be consumed during the scheduled trip comprises the series "Friends" from episode 12 to episode 18. In some embodiments, the system may include a buffer on each side of the downloaded episode and download an additional episode at the beginning and end of the expected duration of media assets expected to be consumed during the scheduled trip.

In some embodiments, the system calculates the total play duration of media assets downloaded on the consumption device by determining a portion of the expected duration of media assets consumed before the scheduled trip. From the example discussed above, the consumer device presents more episodes than expected, and the progression point before the scheduled trip to Canada, where the show "Friends" is not available, is through episode 14, i.e., up to episode 15. Based on the progression point of the consumed media assets shifting (i.e., the user watched more episodes), the system determines a new progression point of media assets expected to be consumed during the scheduled trip. For example, the system determines that the user will now consume episodes 15-21 of "Friends." Based on the new progression point of media assets expected to be consumed during the scheduled trip, the system deletes the media assets already consumed (e.g., episodes 12-14) and stores on the consumption device additional episodes (e.g., episodes 19-21) of the show "Friends" to last the duration of the scheduled trip.

In some embodiments, calculating the total play duration of media assets caused to be stored on the consumption device includes determining a new media asset consumption pattern based on the period leading up to the scheduled trip. For example, the system determines a consumption rate a week before the scheduled trip. Further, the system determines a portion of the expected duration of media assets consumed prior to the scheduled trip. Based on the new media asset consumption pattern, the amount of time before the scheduled trip, and the duration of the scheduled trip, the system identifies a new progression point for the number of media assets to download on the consumption device.

In some embodiments, the system determines the consumption progress of a series of media assets before the scheduled trip. In some embodiments, in response to determining that the user started watching a new series, the system determines the predicted progress based on the consumption pattern. For example, the consumer device plays the series "Friends," and the user has watched up to episode 4 of "Friends" when the scheduled trip is identified. Based on identifying the scheduled trip, the system may determine how far the user will get to before the trip (i.e., how many episodes the user will watch) and how far the user will get to during the trip (i.e., how many episodes the user will watch). Further, the system determines the time remaining before the scheduled trip. For example, the consumer departs for the scheduled trip in 7 days. The system identifies based on the media asset consumption pattern (e.g., approximately 60 minutes per day) and the time remaining before the scheduled trip (e.g., 7 days) the expected progression point (e.g., up to episode 11) of media assets before the scheduled trip. The system stores, based on the expected progression point (e.g., up to episode 11) of media assets before the scheduled trip, episodes of media assets from the expected progression point (e.g., episode 11) of media assets to the expected progression point at the end of trip (e.g., up to episode 18) of media assets.

In some embodiments, the system further determines, based on a first progression point within the presentation of a respective media asset of a plurality of media assets, a second progression point within the presentation of a respective media asset of a plurality of media assets expected to be consumed during the scheduled trip. For example, the system determines that the consumer will have a second progression point within the presentation of a respective media asset of a plurality of media assets of approximately 3.5 hours during an upcoming scheduled trip. Based on the expected second progression point within the presentation of a respective media asset of the plurality of media assets during the scheduled trip, the system may recommend media assets to last the expected duration of consumption time during the scheduled trip. The recommendations are identified by comparing the characteristics of each available content item to a profile associated with the user. For example, the profile may include specific content characteristics preferred by the user or a listing of content previously watched by the user. Characteristics of each available content item are compared with the preferred content characteristics or with characteristics of recently watched content to determine if a particular content item should be recommended.

In some embodiments, the system may determine additional users associated with the profile are expected to be on the scheduled trip. Based on the additional users associated with the profile expected to be on the scheduled trip, the system may consider the consumption pattern of the additional users to determine the expected duration of media assets expected to be consumed during the scheduled trip.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
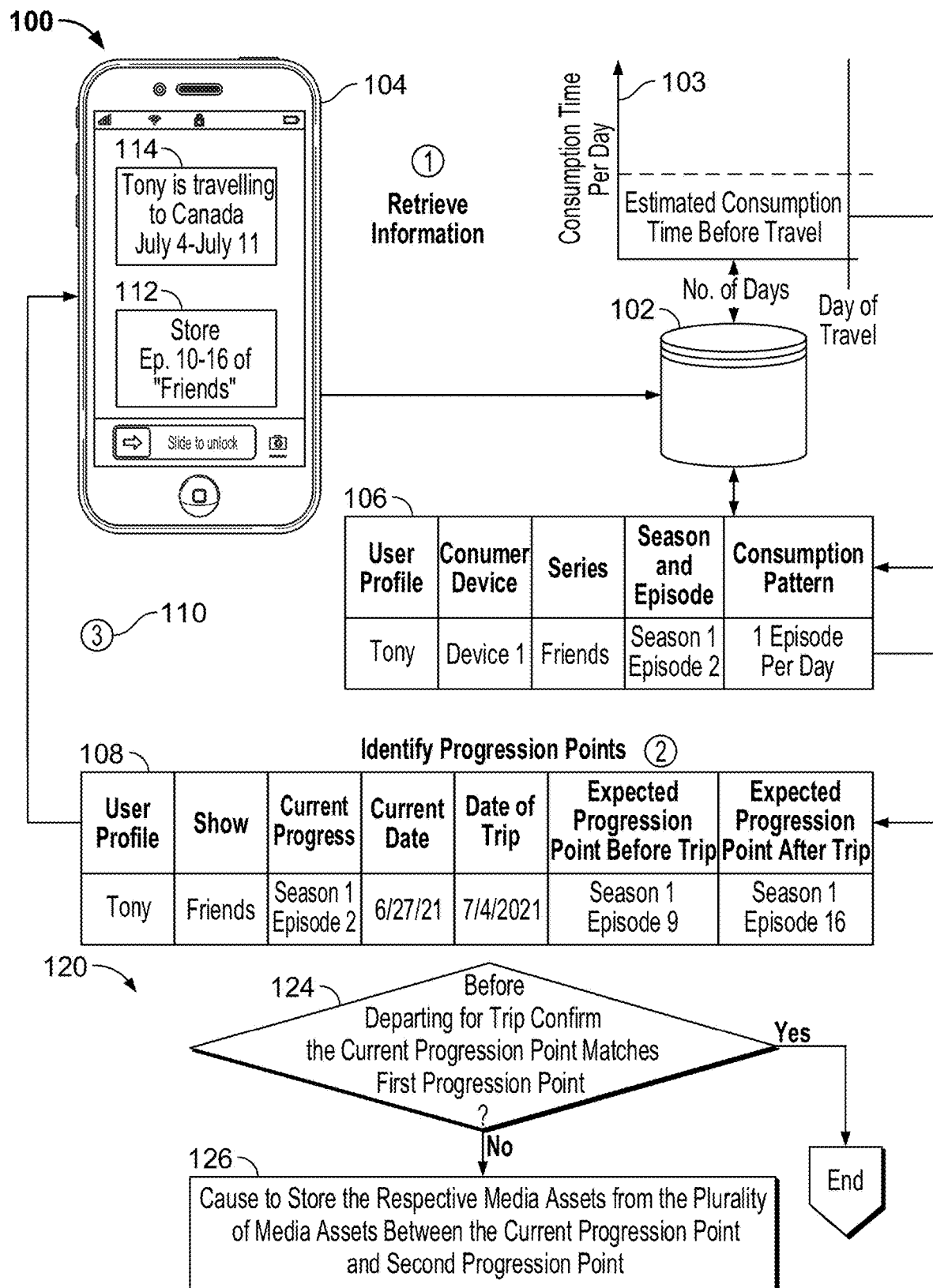
FIG. 1 shows an illustrative example of a system for dynamically optimizing content for consumption for a scheduled trip based on media assets being consumed, in accordance with some embodiments of the disclosure.

FIG. 1 shows an illustrative example of a scenario for dynamically optimizing content for consumption for a scheduled trip based on media assets being consumed, in accordance with some embodiments of the disclosure. User equipment 104 is depicted as a tablet but may be any user equipment with any functionality described below with respect to FIGS. 2-5. User equipment 104 includes control circuitry (also described further below with respect to FIGS. 2-5), which executes a media guidance application (which again is described further below with respect to FIGS. 2-5). The media guidance application may generate for display, either on a display of user equipment 104 or on a display of a different device, electronic communication 114 and instruction alert 112. Electronic communication 114 may be any electronic communication that includes information about a user, such as an email, an MMS or SMS message, calendar information input by a user or automatically populated by the media guidance application, and any other known electronic communication or any combination thereof. Information that may be in the form of an information file that is retrieved that contains some or all of this information described as parsed or gleaned from electronic communication 114 may also be obtained from a user profile, according to some embodiments of the disclosure.

In some embodiments, the media guidance application based on the information may determine that a user will be traveling. For example, the media guidance application may determine based on electronic communication 114 that a user of consumption device 104 will be traveling to Canada. For example, electronic communication 114 may be an email from an airline company that includes an itinerary. In some embodiments, the electronic communication may simply be an out-of-office indication in Microsoft outlook. The media guidance application may determine that content of the electronic communication references travel (e.g., because the electronic communication is from an airline company, or because the electronic communication indicates a destination (e.g., Canada) and a travel date, for example, a start time and end time).

The media guidance application may be an aggregator and/or retriever of multiple content delivery services. For instance, the media guidance application may be able to access, download, and update viewer profiles via corresponding application programming interfaces (APIs) for each service. In some embodiments, the media guidance application may have usernames and passwords stored for each individual. In some embodiments, the media guidance application may have access limited to requesting travel information and enhanced content as needed, e.g., as a privacy concern. In some embodiments, the media guidance application may communicate with a travel application to determine the users will be traveling. For example, the media guidance application can retrieve travel information (e.g., departure date, destination, duration of the trip, length of flight, etc.) from the travel application system via API request and retrieval. Based on the retrieved information, the media guidance application may proceed with optimizing the media assets stored on the consumption device.

The media guidance application may similarly process any electronic communication 114. For example, information may be parsed from a calendar entry, an MMS message, a voice communication with another user that was detected by a user input interface (user input interfaces are described below with respect to FIGS. 2-5), or any other communication. Parsing may occur by comparing the text to a database of known words that indicate travel, such as country, state, and city names, airline names, train company names, and any other words that indicate travel. Parsing may also occur based on credit card, bank, and purchase statements (which may indicate that travel was purchased) and by any other means.

In some embodiments, in response to retrieving the information (e.g., the identifying of the user traveling to Canada), the media guidance application may access a viewing history of the content the user has been consuming indicated by a profile of the user that indicates a plurality of streaming media that the user consumes. For example, the user may subscribe to a media streaming service (e.g., Spotify for music streaming, Netflix for video streaming), or to an aggregate service where the user can access streaming media from other media streaming services. Video streaming services commonly allow users to populate a watch list, which is a list of media that the user desires to watch in the near future. In some embodiments, the user, without adding the content to the watch list, may watch a series (e.g., the show "Friends") or a collection of movies (e.g., a collection of "Rocky" movies or the "Terminator" movie series). In some embodiments, the playlist may be based on some form of recommendation. For example, if the user watches season 1 of "The Office," the playlist may include season 2 of "The Office." The media guidance application may suggest content for downloading to the consumption device for improved consumer engagement based on the recent consumption. The suggestions may further be based on the user profile and tailored to the demographic of the user profile. In some embodiments, the system may suggest what the user should download based on their recent consumption pattern. For example, if there's a "kids" profile associated with the account, then content items from that "catalog" may also be recommended for download or automatically downloaded. The playlists are also often used in video services and music services, and playlists may indicate media that users wish to consume in the near future in a specified order.

Using any of these lists, the user may proactively maintain a list of media he or she wishes to consume in the future. Alternatively, a profile may indicate media that the user is likely to want to consume in the future. For example, a profile may indicate that a user generally views episodes of a certain series within a few days of when those episodes are available or may indicate that a user has begun viewing some episodes of a series and thus is likely to desire continued access to the remaining episodes of the series.

On the basis of these lists or based on information in the user's profile, the media guidance application may determine that a user enjoys a particular show or a collection of movies but will not be able to stream it or them due to the scheduled trip. For example, in some embodiments, the media guidance application may compare data corresponding to each streaming media asset of the plurality of streaming media assets to a database to determine whether each streaming media asset of the plurality of streaming media assets is accessible to the user during the scheduled trip for the duration of the period. The data that may be compared to the database may be any type of data corresponding to media assets, such as title, production company, distribution company, or any other data that may be used as a basis for a content restriction by a media provider such as a media streaming provider.

In some embodiments, the identified media assets (e.g., shows or movies) either from a list or recommended may not all be available at a destination. For example, some of the shows or movies may be available and some may be restricted. Based on identifying the movies that the user is likely to watch (based on a watch list or recommended list), the system may assign an order to the movies. In response to identifying a scheduled trip to a destination where one or more of the movies from the ordered list is not available, the system may reorder or reshuffle the movies. For example, the system may reshuffle the movies not available at the destination before the scheduled trip. In another example, the movies may be reordered for the consumer after the trip. The order of consuming the movies may be determined based on the consumer pattern. Based on determining that some movies may not be available, the system may optimize the order of the movies to ensure that the user is able to view all of the movies. That is, the priority of the movies may be reshuffled. In this instance, the user wants to consume four movies from the series of "Rocky" movies, however, when at the destination, only 2 of the movies are available, and the other 2 movies are restricted. For that reason, the media device may reshuffle the movies such that the consumer is able to watch the movies restricted at the destination before the scheduled trip and the remaining two movies are consumed at the destination. In another example, the system determines that movies 2 and 3 will be unavailable at the destination. So, the system shuffles the priority of the watch list so that movies 2 and 3 are moved to the top of the watch list, and the user may consume them before he or she travels. The other movies 1 and 4 are available at the destination as well, therefore may be consumed at leisure. In some embodiments, the system may maintain the movies' order and instead cause the consumption device to download the movies. For example, the four "Rocky" movies may need to be consumed in sequence to avoid misunderstanding. Therefore, the consumption device may download the movies that are likely to be consumed during the scheduled trip. For example, movies 2 and 3 may be downloaded for consumption during the scheduled trip.

In some embodiments, the plurality of streaming media is associated with a particular streaming media provider (e.g., Netflix, which provides streaming videos, or Spotify, which provides streaming music). The different content is often due to licensing restrictions placed on content. For example, media streaming providers like Netflix provide different content to subscribers in different countries where distribution is by the owners of the media. Thus, the database may indicate geographic content restrictions for the particular streaming media provider, such as associations between media assets and various countries and locations in which the media is available or is not available. The media guidance application may, when determining that the subset of the plurality of media is or is not accessible to the user on the scheduled trip for the duration of the period of time, identify that media assets of the subset are indicated as available or restricted at a destination of the scheduled trip in the reference databases.

The media guidance application may retrieve information about a scheduled trip from travel sources. For example, a media guidance application may communicate with a travel application (e.g., Expedia) to determine the users will be traveling. For example, the media guidance application can retrieve travel information (e.g., departure date, destination, duration of the trip, length of flight, etc.) The media guidance application may retrieve a user consumption pattern based on the user's viewing habits. The media guidance application may alert the user of a scheduled trip and the need to optimize the media assets downloaded on the consumption device. In some embodiments, the media guidance application may proceed to optimize the storage on the consumption device 104 to maximize the amount of content stored for the duration of the scheduled trip where the content is not available in a destination location.

The media guidance application may identify that a first media asset from a first media source is being played at the user equipment. For example, the user may be watching a tennis match from the ESPN channel, e.g., shown as the currently played media asset 108. In some embodiments, in response to determining that the user started watching a new series, the system may determine a predicted progression point based on the consumption pattern and a future time. The media guidance application may then retrieve metadata corresponding to the first media asset and user behavioral data from a user profile. For example, the media guidance application may retrieve metadata including the program title, closed captioning data, a program description, information relating to the event such as the event schedule (e.g., the schedule of the tennis event, etc.), and/or the like. For another example, the media guidance application may obtain user behavioral data from the user profile, including but not limited to user preference data (e.g., frequently watched programs or channels, user bookmarked channels or media assets, categories that user frequently watches, etc.), user viewing history (e.g., user viewing pattern, unfinished VOD media assets or previously stored media assets, and/or the like). For example, as shown in FIG. 1, the consumption pattern chart 103 is based on the watching history of the user associated with the consumption device. The consumption pattern chart 103 illustrates that the user consumes the estimated consumption time over the number of days. For example, if the user watches a total of 21 hours a week, then the consumption pattern is 21 hours by 7 days to equal 3 hours of consumption time. In the illustrative scenario, the consumption device 104 communicates with server 102 to access the user profile consumption pattern 106. In the user profile consumption pattern 106, the media guidance application determines the estimated consumption time as stored for the consumer and the content being consumed. In some embodiments, the consumption pattern may be content-specific, for example, for one show, the consumer may watch 2 hours while another show may only be an average of half an hour. In the illustrative example, the consumer is watching the show "Friends" and is on Season 1 Episode 2; the media guidance application also determines that the consumption speed at which the episodes are being consumed is 1 episode per day. The consumption speed may be tracked based on time or episodes.

The media guidance application may then calculate an estimated consumption pattern that may be extrapolated to determine the amount of content the user is likely to consume over a period. As shown in user progression pattern 108, the media guidance application may identify, based on the consumption pattern, a first progression point within a presentation of a respective media asset of a plurality of media assets at the scheduled start time. For example, the media guidance application may predict based on a scheduled trip (e.g., the current date of June 27 and date the trip starts as of July 4), thus 7 days, and the consumption patterns of (1 episode per day) that the first progression point is likely to be episode 9. Before the trip starts, the user is likely to watch up to episode 9 of "Friends." In response to identifying the first progression point as episode 9, the media guidance application then identifies, based on the consumption pattern, a second progression point in the respective media asset of the plurality of media assets by the scheduled end time. For example, the media guidance application may predict based on a scheduled trip (e.g., the first progression point (i.e., in the future) of July 4 and date the trip ends as of July 11), thus 7 days, and the consumption patterns of (1 episode per day) that the second progression point (i.e., in the future) is likely to be episode 16, as to the number of media assets that are predicted to be consumed based at least in part on the retrieved metadata and the consumption pattern. By the time the trip ends, the user will likely watch up to episode 16 of "Friends." In response to identifying these two progression points, the device downloads and stores on the device episodes 10-16 for the duration of the trip. The media guidance application may inform the user of this fact by way of an alert. This download may be performed during off-peak hours and when the device is in sleep mode or otherwise not employed in other tasks. Further, employing such a task allows the device to maintain space for other activities and does not arbitrarily contain large stored content.

Continuing in FIG. 1 before the user departs for the trip, the media guidance application then proceeds to process 120, and at 124 confirms that the current progression point matches the first progression point as initially predicted and as the basis for downloading episodes of the media asset, to optimize the amount of content downloaded for a trip based on the progress of consuming the programming. For example, the media guidance application determines that the user has reached the predicted point in the series to continue watching the series when at the destination of the scheduled trip. For example, the media guidance application may determine that the last episode consumed (heard, watched, read) is the episode that was predicted to be completed ("Yes" at 124), then the media guidance application continues without making any adjustments to the stored media assets. If, on the other hand, the media guidance application determines that the last episode consumed (heard, watched, read) is greater or less than the episode that was predicted (first progression point) to be completed ("No" at 124), then at 126, the media guidance application causes to store the respective media assets from the plurality of media assets between the current progression point and second progression point. For example, the media guidance application adjusts the media assets stored on the device based on the difference between the first progression point and the current progression point. For example, when the user is ahead of schedule, the media guidance application deletes media assets already consumed and downloads additional upcoming media assets of the series back end or the watch list. In another example, the device deletes three episodes the user has seen and downloads equivalent episodes sequentially following the episodes already downloaded. On the other hand, when the user is behind schedule, the media guidance application deletes media assets from the end of the series or the watch list and downloads additional media assets following the last episode consumed. In another example, the device deletes the last three episodes in the sequence to free up space and downloads three episodes from the current progression point of the list sequentially following the episodes already consumed by the user. Furthermore, in some embodiments, the media guidance application may perform the comparison (and/or any determinations) prior to the scheduled start time of the scheduled trip. Alternatively or additionally, the media guidance application may continually monitor the progress of the user to inform him or her of whether or not he or she will finish the media asset (or whether the unconsumed portion will need to be consumed later or on a different device) before departing for the scheduled trip. In some embodiments, a portion of the media asset, corresponding to the unconsumed content remaining in the media asset, is available for download to a second device to be shared to free up space for additional media assets to be downloaded. For example, in response to determining that the user may not be able to consume the entirety of the media asset, the media guidance application may allow the user to access the unconsumed portion on a second device. In some embodiments, the indication may be simultaneously displayed with the media listing (e.g., in order to prompt the user to select the media asset for playback as discussed above).

In some embodiments, the media guidance application may determine that the user generally views media in the company of friends or family. The media guidance application may consider watch lists or future viewing preferences of the friends or family when generating for display alert 114, and may incorporate the viewing preferences of the friends or family in alert 114.

The amount of content available to users in any given content delivery system can be substantial; however, the hardware may be limited, and the data associated with the content may cause further processing delays to the hardware. Thus what is needed is a way to optimize the amount of content stored on the device without limiting the device for other purposes, that is, so that a user doesn't have to bring one device for consuming content and another device for other tasks. It is necessary to provide a system and methods of operation of a device by dynamically optimizing how much (e.g., number of episodes of a show or number of movies stored) of the content of the downloadable streaming media is saved on the consumer device to allows users to efficiently store content on the device without wasting storage space. An application that provides such guidance is referred to herein as a media guidance application.

Figure 2:
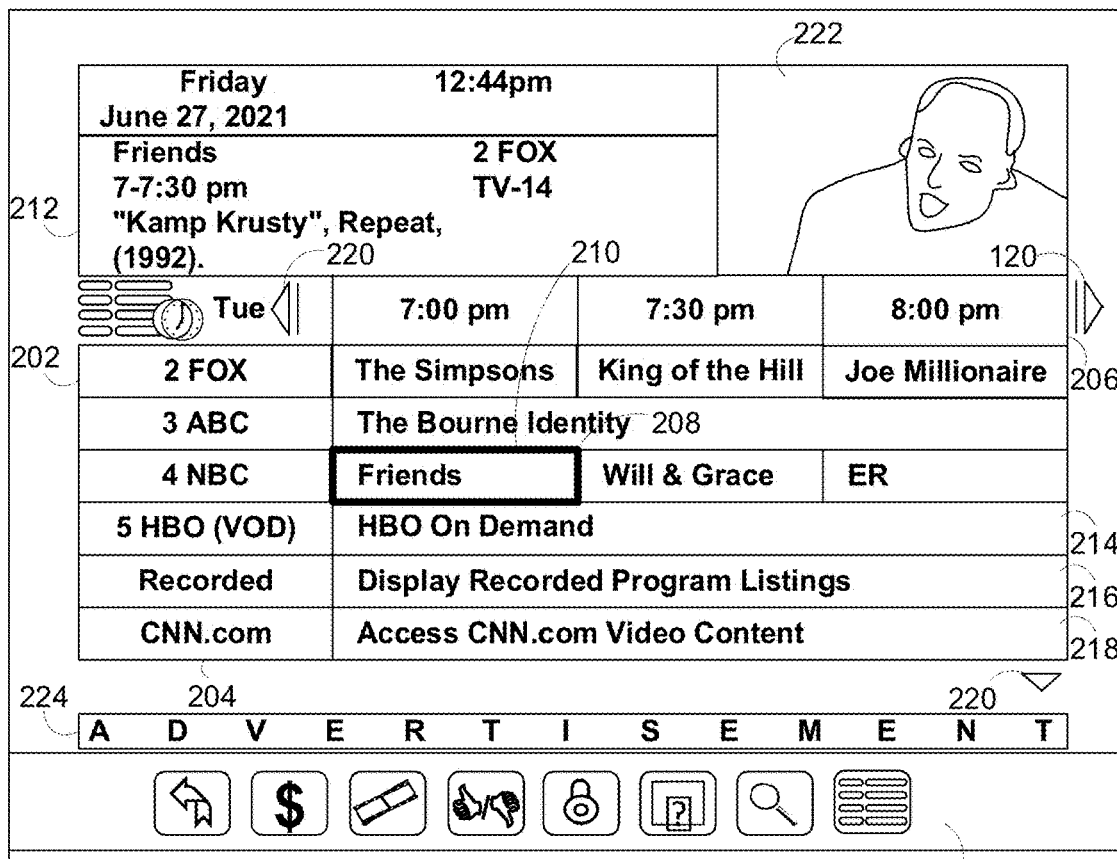
FIG. 2 shows an illustrative embodiment of a display screen that may be used to provide media guidance application listings and other media guidance information, in accordance with some embodiments of the disclosure.

FIG. 2 shows an illustrative embodiment of a display screen that may be used to provide media guidance application listings and other media guidance information, in accordance with some embodiments of the disclosure. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage devices), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202. These listings may provide access to a display dedicated to on-demand listings, recorded listings, and recorded listings or Internet listings, respectively. In some embodiments, listings for these content types may be included directly in grid 202. Additional media guidance data may be displayed in response to the user selecting one of the navigational icons 220. (Pressing an arrow key on a user input device may similarly affect the display as selecting navigational icons 220.)

Display 200 may also include video region 222, and options region 226. Video region 222 may allow the user to view and/or preview programs that are currently available, will be available, or were available to the user. The content of video region 222 may correspond to, or be independent of, one of the listings displayed in grid 202.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from the main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 2D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, email, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.xperi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. The media guidance application may allow an optimization module configured to operate on the consumption device to run in the background and optimize the amount of content stored on the consumption device. The optimization module may operate as a smart storage driver that determines the amount of content to store on the device for the expected duration of time the user is on a scheduled trip.

Figure 3:
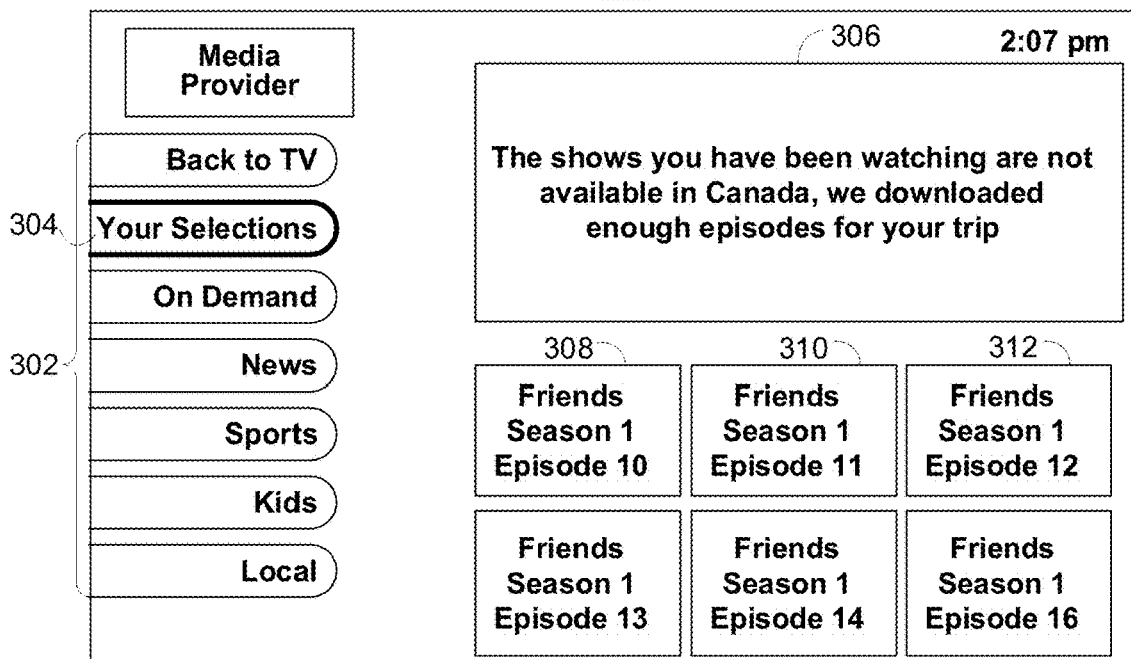
FIG. 3 shows another illustrative embodiment of a display screen that may be used to provide media guidance application listings, in accordance with some embodiments of the disclosure.

FIG. 3 shows another illustrative embodiment of a display screen that may be used to provide media guidance application listings, in accordance with some embodiments of the disclosure. Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion.

The listings in display 300 are of different sizes (i.e., listing 306 is larger than listings 308, 310, and 312), but all the listings may be the same size if desired. Listings may be of different sizes or graphically accentuated to indicate degrees of interest to the user or to emphasize certain content, as desired by the content provider or based on user preferences. Listing 306 may provide a notification to alert him or her that something he or she has been watching may not be available at the destination of the scheduled trip. For example, the notification may indicate the following "The shows you have been watching are not available in Canada. The system may download enough episodes for the duration of your trip." Based on this notification, listings 308-312 may be episodes that are stored on the consumption device. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
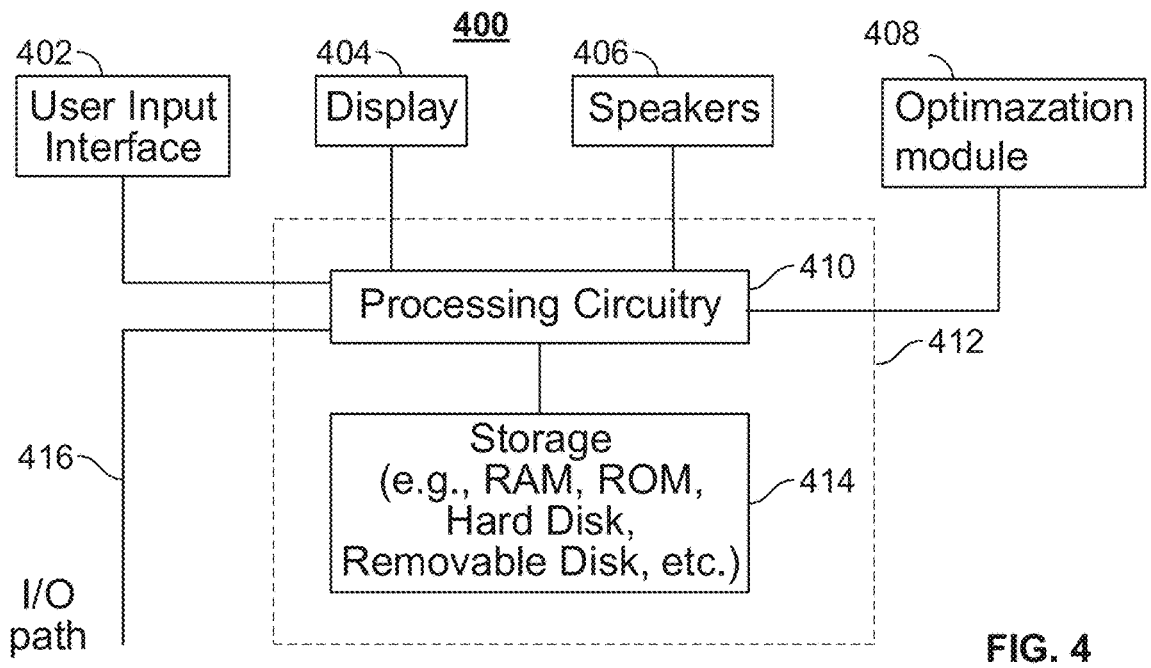
FIG. 4 depicts exemplary systems, servers and related hardware for dynamically optimizing content for consumption for a scheduled trip, in accordance with some embodiments of the disclosure.

FIG. 4 depicts exemplary systems, servers and related hardware for optimizing downloaded media assets unavailable for a scheduled trip based on the expected duration of media assets expected to be consumed during the scheduled trip, in accordance with some embodiments of the disclosure. A user may access content and the media interface application (and its display screens described above and below) from one or more of their user equipment devices. Each device may connect to the communication network where content may be transmitted, processed, and pushed out. FIG. 4 shows a generalized embodiment of illustrative user equipment device 400. More specific implementations of user equipment devices are discussed above in connection with FIG. 5. User equipment device 400 may receive content and data via input/output (I/O) path 416. I/O path 416 may provide content (e.g., broadcast programming, on-demand programming, Internet content, content available over a local area network (LAN) or wide area network (WAN), and/or other content) and data to control circuitry 412, which includes processing circuitry 410 and storage 414. Control circuitry 412 may be used to send and receive commands, requests, and other suitable data using I/O path 416.

Control circuitry 412 may be based on any suitable processing circuitry such as processing circuitry 410. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units. In some embodiments, control circuitry 412 executes instructions for a media interface application stored in memory (i.e., storage 414). Specifically, control circuitry 412 may be instructed by the user interface application to perform the functions discussed above and below. For example, the user interface application may provide instructions to control circuitry 412 to generate the video and audio content for display. In some implementations, any action performed by control circuitry 412 may be based on instructions received from the user interface application.

In client/server-based embodiments, control circuitry 412 may include communications circuitry suitable for communicating with a content application server or other networks or servers. The instructions for carrying out the above-mentioned functionality may be stored on the content application server. Communications circuitry may include a cable modem, an integrated-services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which are described in more detail in connection with FIG. 5). In some embodiments, an optimization module 408 is provided in the user equipment device 400. The optimization module 408 may be used for processing the amount of content stored on the consumer device and the user's consumption pattern to maintain an ample amount of content on the device without wasting storage space by over downloading content. Further, communications circuitry may include circuitry that enables peer-to-peer communication of user equipment devices or communication of user equipment devices in locations remote from each other (described in more detail below).

Memory may be an electronic storage device provided as storage 414 that is part of control circuitry 412. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 414 may be used to store various types of content described herein as well as content data and content application data that are described above. Nonvolatile memory may also be used (e.g., to launch a boot-up routine and other instructions). Cloud-based storage may be used to supplement storage 414 or instead of storage 414.

Control circuitry 412 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 412 may also include scaler circuitry for upconverting and down-converting content into the preferred output format of the user equipment device 400. Control Circuitry 412 may also include digital-to-analog converter circuitry and analog-to-digital converter circuitry for converting between digital and analog signals. The tuning and encoding circuitry may be used by the user equipment device to receive and to display, play, or record content.

In one embodiment, speakers 406 may be provided as integrated with other elements of user equipment device 400 or may be stand-alone units. The audio and other content displayed on display 404 may be played through speakers 406. In some embodiments, the audio may be distributed to a receiver (not shown), which processes and outputs the audio via speakers 406.

In some embodiments, a sensor (not shown) is provided in the user equipment device 400. The sensor may be used to monitor, identify, and determine user presence in the proximity of the user device. For example, the user interface application running on a user equipment device may receive status data from the sensor, servers, or any other equipment device indicating the status of the group watch party. In particular, a notification may be displayed on the user equipment device that a watch party started and that the user is missing out on the fun in the cousin's group.

The user interface application may be implemented using any suitable architecture. For example, it may be a stand-alone application wholly implemented on user equipment device 400. In such an approach, instructions of the application are stored locally (e.g., in storage 414), and data for use by the application is downloaded on a periodic basis (e.g., from an out-of-band feed, from an Internet resource, or using another suitable approach). Control circuitry 412 may retrieve instructions of the application from storage 414 and process the instructions to generate any of the displays discussed herein. Based on the processed instructions, control circuitry 412 may determine what action to perform when input is received from input interface 402. For example, the movement of a cursor on an audio user interface element may be indicated by the processed instructions when input interface 402 indicates that a user interface 118 was selected.

In some embodiments, the user interface application is a client/server-based application. Data for use by a thick or thin client implemented on user equipment device 400 is retrieved on-demand and in collaboration with other devices from the first group by issuing requests to a server remote to the user equipment device 400. In one example of a client/server-based content application, control circuitry 412 runs a web browser that interprets web pages provided by a remote server. For example, the remote server may store the instructions for the application in a storage device. The remote server may process the stored instructions using circuitry (e.g., control circuitry 412) and generate the displays discussed above and below. The client device may receive the displays generated by the remote server and may display the content of the displays locally on user equipment device 400 that is synchronized with the content of the displays on other equipment devices 400 associated in the first group. This way, the processing of the instructions is performed remotely by the server while the resulting displays are provided locally on user equipment device 400. User equipment device 400 may receive inputs from the user via input interface 402 and transmit those inputs to the remote server for processing and generating the corresponding displays. For example, user equipment device 400 may transmit, via antenna 408, communication to the remote server, indicating that a user interface element was selected via input interface 402. The remote server may process instructions in accordance with that input and generate a display of content identifiers associated with the selected user interface element as described in greater detail with reference to FIG. 7. The generated display is then transmitted to the user equipment device 400 for concurrent presentation to the user as well as to other members in the group watch.

In some embodiments, the user interface application is downloaded and interpreted or otherwise run by an interpreter or virtual machine (run by control circuitry 412). In some embodiments, the user interface application may be encoded in the ETV Binary Interchange Format (EBIF), received by control circuitry 412 as part of a suitable feed, and interpreted by a user agent running on control circuitry 412. For example, the user interface application may be an EBIF application. In some embodiments, the user interface application may be defined by a series of JAVA-based files that are received and run by a local virtual machine or other suitable middleware executed by control circuitry 412. In some of such embodiments (e.g., those employing MPEG-2 or other digital media encoding schemes), the user interface application may be, for example, encoded and transmitted in a MPEG-2 object carousel with the MPEG audio of a program.

Figure 5:
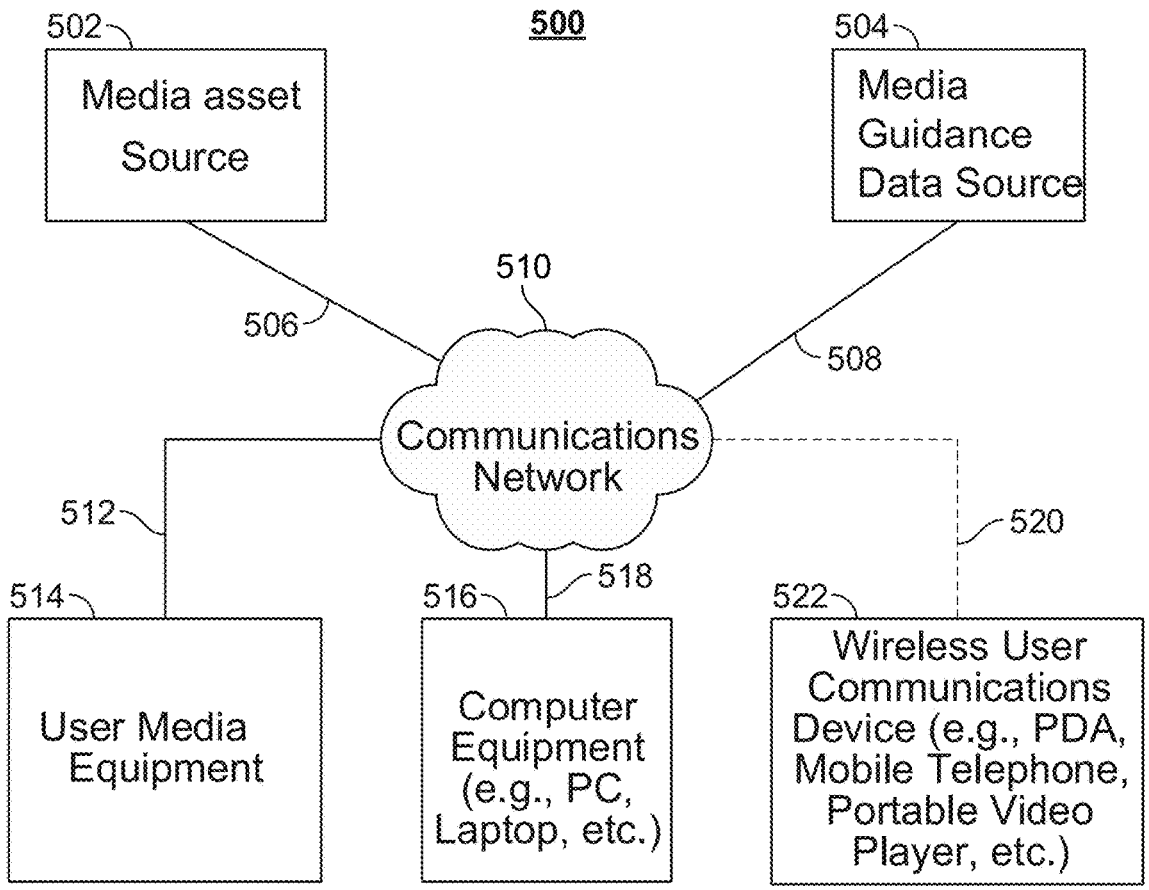
FIG. 5 depicts exemplary systems, servers and related hardware for dynamically optimizing content for consumption for a scheduled trip, in accordance with some embodiments of the disclosure.

User equipment device 400 of FIG. 4 can be implemented in system 500 of FIG. 5 as user media equipment 514, computer equipment 518, wireless user communications device 522 or any other type of user equipment suitable for accessing content, such as a non-portable gaming machine. For simplicity, these devices may be referred to herein collectively as user equipment or user equipment devices and may be substantially similar to user equipment devices described above. User equipment devices, on which a user interface application may be implemented, may function as stand-alone devices or may be part of a network of devices. Various network configurations of devices may be implemented and are discussed in more detail below.

FIG. 5 depicts exemplary systems, servers and related hardware for providing summaries of multiple contents from group watching a concurrent presentation, in accordance with some embodiments of the disclosure. A user equipment device utilizing at least some of the system features described above in connection with FIG. 5 may not be classified solely as user media equipment 514, computer equipment 516, or a wireless user communications device 522. For example, user media equipment 514 may, like some computer equipment 516, be Internet-enabled, allowing for access to Internet content, while wireless user computer equipment 522 may, like some user media equipment 514, include a tuner allowing for access to media programming. The user interface application may have the same layout on various types of user equipment or may be tailored to the display capabilities of the user equipment. For example, on wireless user computer equipment 516, the user interface application may be provided as a website accessed by a web browser. In another example, the user interface application may be scaled down for wireless user communications devices 522.

The user equipment devices may be coupled to communications network 510. Communications network 510 may be one or more networks including the Internet, a mobile phone network, mobile voice or data network (e.g., a 4G, 5G or LTE network), cable network, public switched telephone network or other types of communications network or combinations of communications networks.

System 500 includes media asset source 502 and content reaction data source 504 coupled to communications network 510. Communications with the media asset source 502 and the data source 504 may be exchanged over one or more communications paths but are shown as a single path in FIG. 5 to avoid overcomplicating the drawing. Although communications between sources 502 and 504 with user equipment devices 514, 516, and 522 are shown through communications network 510, in some embodiments, media asset sources 502 and media guidance data source 504 may communicate directly with user equipment devices 514, 516, and 522.

Media asset source 502 may include one or more types of content distribution equipment including a media distribution facility, satellite distribution facility, programming sources, intermediate distribution facilities and/or servers, Internet providers, on-demand media servers, and other content providers. Media guidance data source 504 may provide content data, such as the audio described above. Media content interface application data may be provided to the user equipment devices using any suitable approach. In some embodiments, media content interface data from media guidance data source 504 may be provided to users' equipment using a client/server approach. For example, a user equipment device may pull content data from a server, or a server may present the content data to a user equipment device. Media guidance data source 504 may provide user equipment devices 514, 516 and 522 the content reactions received from user equipment devices 514, 516 and 522 or any other user devices including the interface application itself or software updates for the user interface application.

Figure 8:
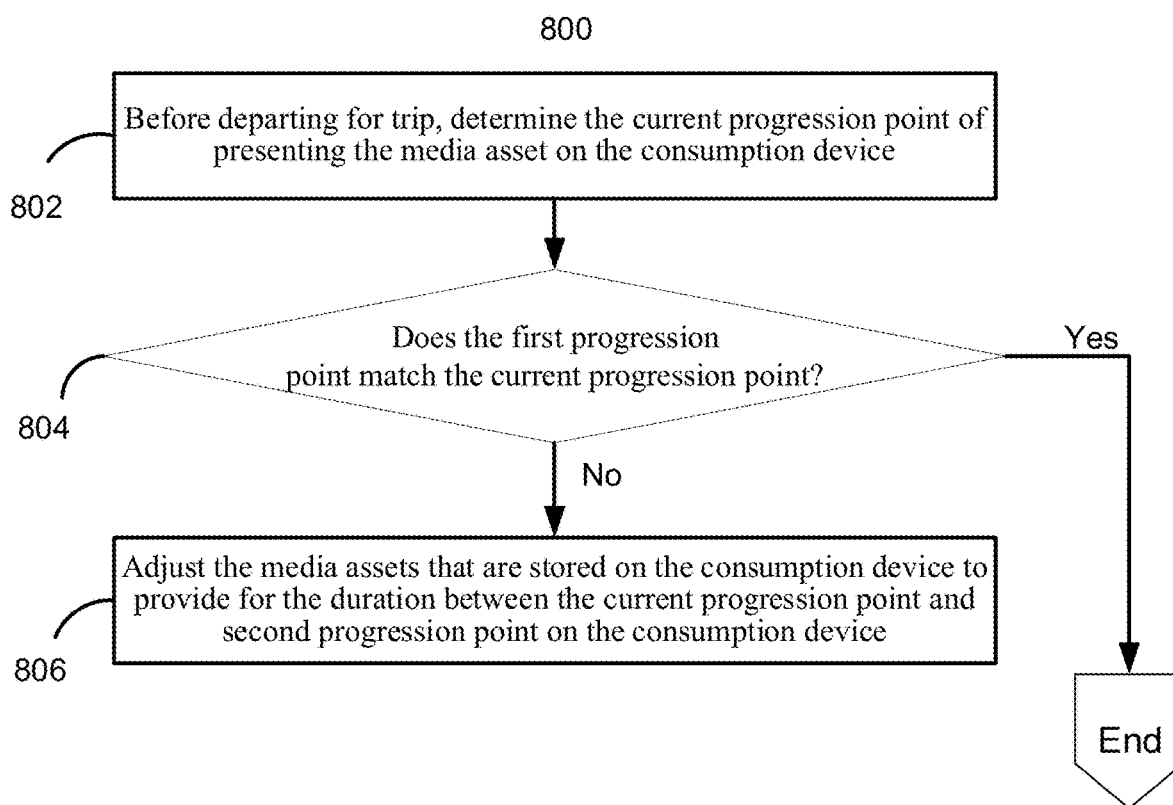
FIG. 8 is a flowchart of a detailed illustrative process for adjusting the stored content based on the progression point, in accordance with some embodiments of the disclosure.
Figure 9:
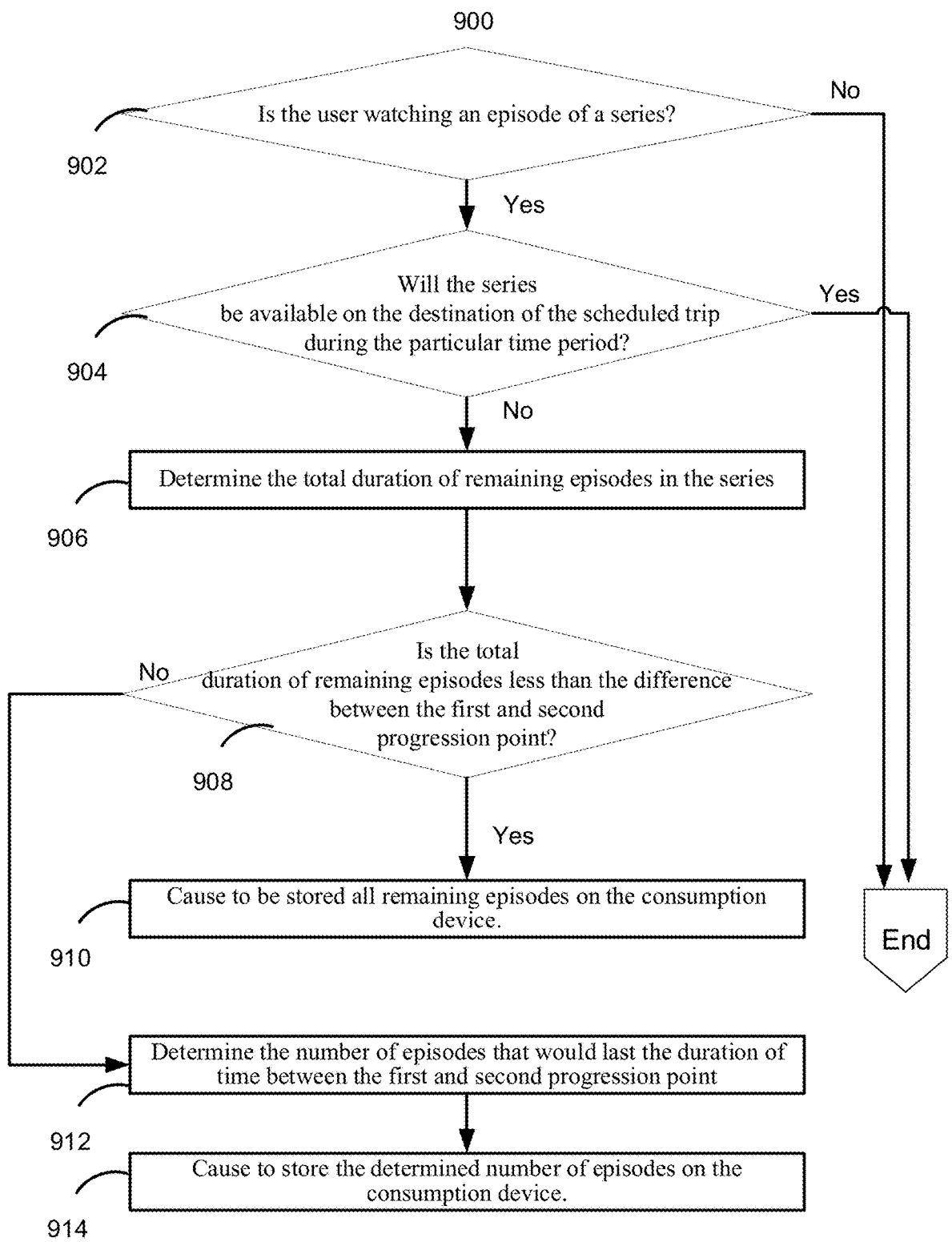
FIG. 9 is a flowchart representing a process for alerting a user to the availability of a series for a scheduled trip, in accordance with some embodiments of the disclosure.

It is contemplated that the steps or descriptions of FIGS. 8-9 may be used with any other embodiment of this disclosure. In addition, the steps and descriptions are described in relation to FIGS. 8-10 may be done in alternative orders or in parallel to further the purposes of this disclosure. Any of these steps may also be skipped or omitted from the process. Furthermore, it should be noted that any of the devices or equipment discussed in relation to FIGS. 4-5 could be used to perform one or more of the steps in FIGS. 8-9.

Figure 6:
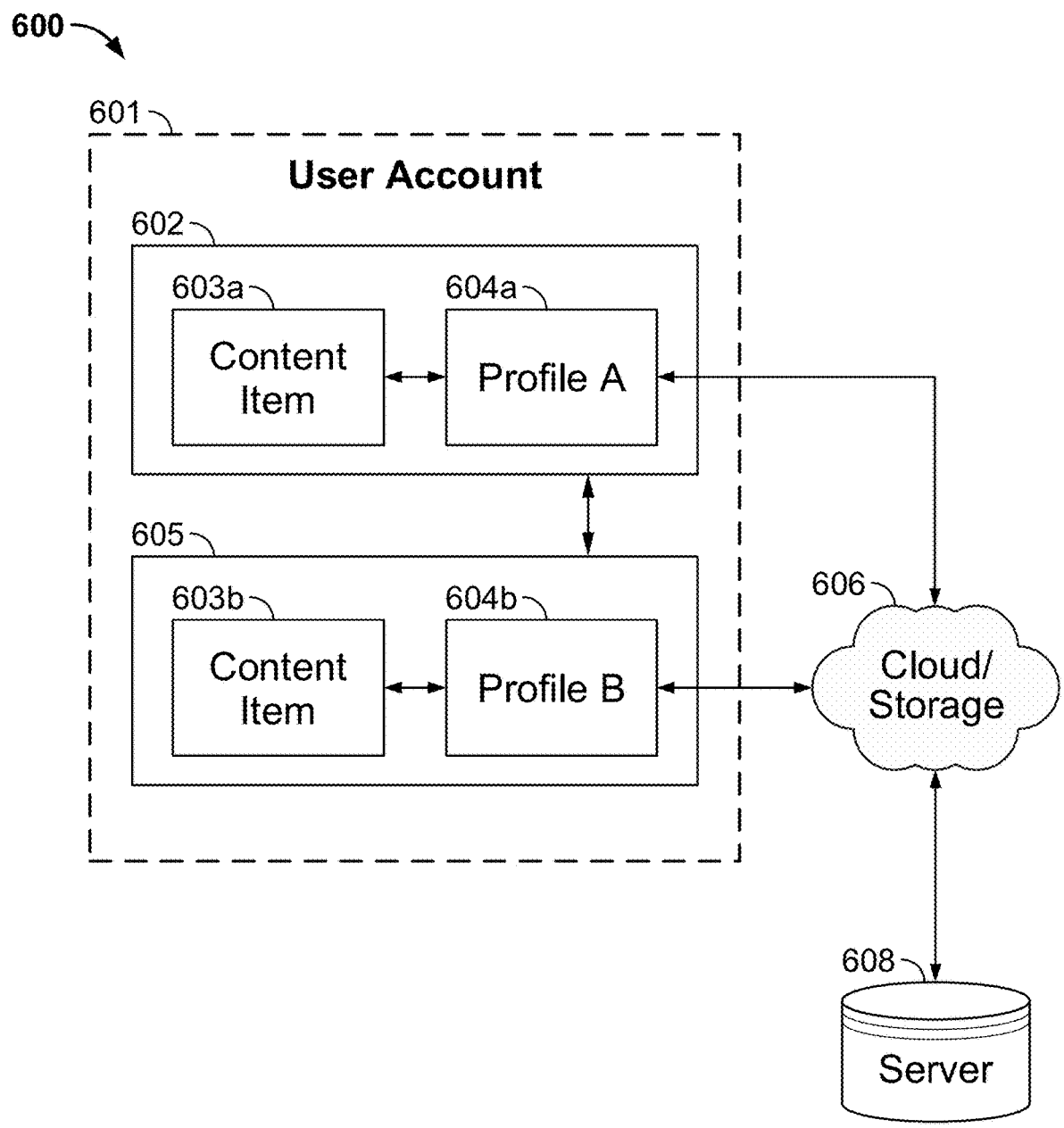
FIG. 6 depicts an illustrative example of a system of user devices as part of an account that may share content between each other when content is restricted due to geographical restriction, in accordance with some embodiments of the present disclosure.

FIG. 6 depicts an illustrative example of a system of user devices as part of an account that may share content among them when content is restricted due to geographical restriction, in accordance with some embodiments of the present disclosure. FIG. 6 shows a generalized embodiment of an illustrative system 600, in which a user account 601 of users or profiles is causing for presentation a content item on individual user devices, for example, the user equipment devices 602 and 605, and on which the system 100 of FIG. 1 can be implemented. By employing multiple devices, the devices together may contain storage for additional media assets that may be transmitted back and forth between the devices even when on the destination with restrictions on the media asset. The exemplary user devices 602 and 605 may communicate with each other over a local area network where they may share content stored on each device to avoid downloading twice. System 600 includes an array of user devices, which may be linked by unique profiles 604 (e.g., 604a, 604b, etc.), that all fall under the user account and may cause for presentation of the content item (e.g., 603a, 603b, etc.), with each content device being configured to store content. By employing multiple devices, the devices together may contain storage for additional media assets that may be transmitted back and forth even at a destination with restrictions on the media asset. In some embodiments, the user device (e.g., first device 602, etc.) may be coupled to storage device 606, server 608 and a second user device 605 providing a selection to share content. The devices can communicate bidirectionally with other systems. Communications with the user devices and storage device 606 may be exchanged over one or more communications paths but are shown as a single path in FIG. 6 to avoid overcomplicating the drawing. All of the communication between the user devices 602 and 605 in the user account, and servers joining the user account may be through one or more networks including the Internet, a mobile phone network, mobile voice or data network (e.g., a 4G, 5G or LTE network), or other types of communications network or combinations of communications networks.

In some embodiments, the system permits sharing of the media assets stored on a first device with a second device 602 and 605. For example, when both devices are part of an account profile, that is, if the system knows that Profile A associated with the account downloaded movies 1, 2, and 3, then there would be no need to download movies 1, 2, and 3 to the device associated with Profile B. Both devices are tied to the same account (if such movies also meet Profile B's preferences). This way, users traveling together can download more content and not waste storage space on their devices. For these specific content items, the system can enable the transfer of content between the two devices (if the users don't want to swap devices to watch content that was not downloaded to their device). Specifically, the system can add Digital Rights Management (DRM) restriction to enable only Profile B to transfer/watch the content on their device.

Figure 7:
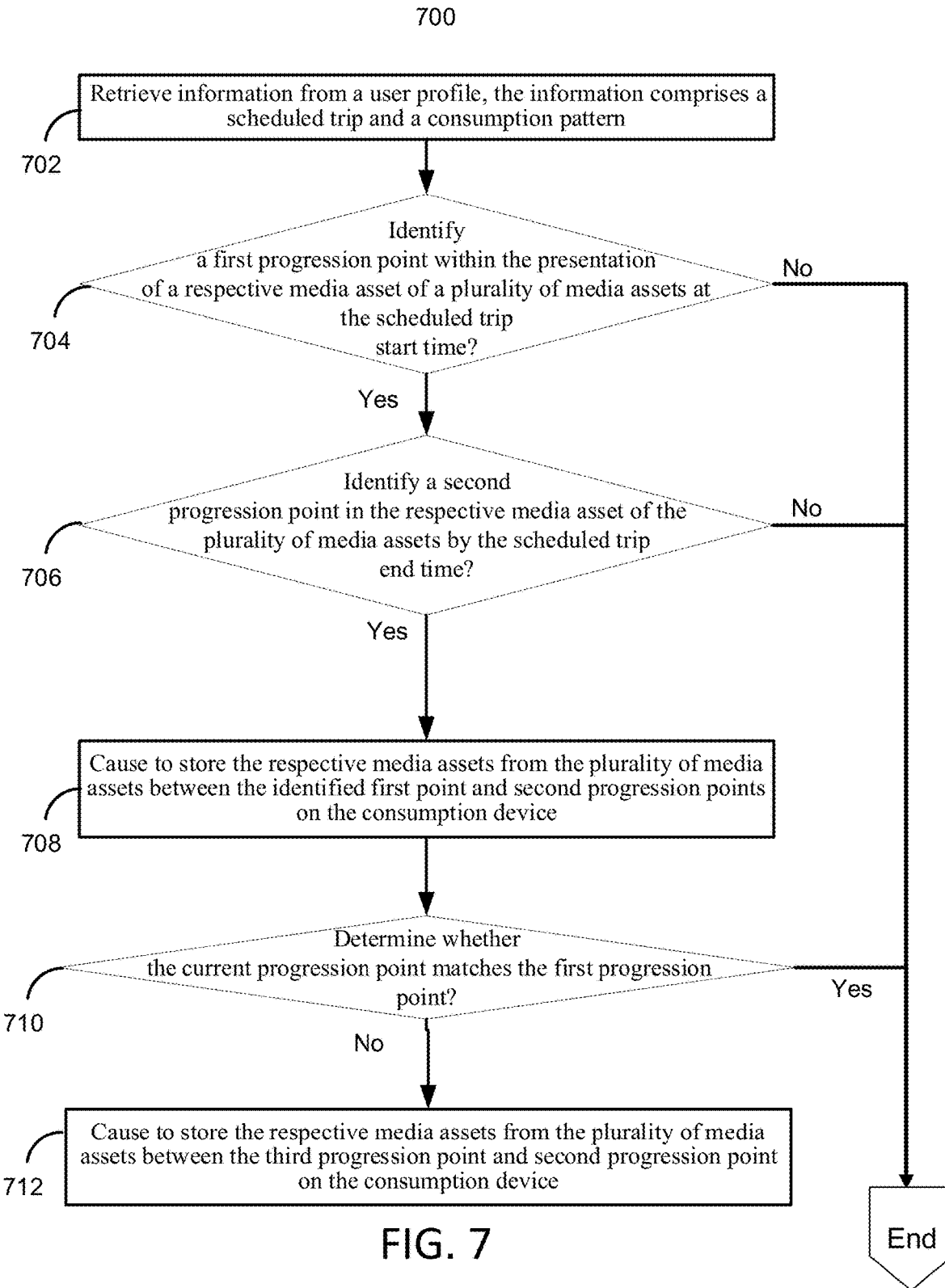
FIG. 7 depicts an illustrative flowchart of a process for dynamically optimizing content for consumption for a scheduled trip, in accordance with some embodiments of the disclosure.

FIG. 7 depicts an illustrative flowchart of a process for dynamically optimizing content for consumption for a scheduled trip, in accordance with some embodiments of the disclosure. It should be noted that process 700 or any step thereof could be performed on, or provided by, any of the devices shown in FIGS. 4, 5. For example, process 700 may be executed by control circuitry 412 as instructed by a media guidance application implemented on a user device (e.g., user equipment devices 514, 516, and/or 522 (FIG. 5)) in order to optimize the amount of content stored on the consumption device. In addition, one or more steps of process 700 may be incorporated into or combined with one or more steps of any other process or embodiment (e.g., as described in relation to FIGS. 6 and 8-9)).

At 702, the media guidance application retrieves information from a user profile, and the information comprises a scheduled trip and a consumption pattern. For example, the scheduled trip may include a scheduled start time and a scheduled end time. For example, the system determines that the user travels to Canada in 7 days for a 7-day stay. The system calculates based on the asset consumption pattern (e.g., 1 hour consumption rate) a first progression point of 7 hours of content and the duration (e.g., 7 days) of the scheduled trip (e.g., Canada) an expected duration of media assets expected to be consumed during the scheduled trip (e.g., 7 hours of content).

Then, at 704, the media guidance application identifies a first progression point within the presentation of a respective media asset of a plurality of media assets at the scheduled trip start time. For example, the consumer device associated with the user profile is consuming episode 2 of season 1 of "Friends" and identifies based on the timeline that in 1 week (e.g., scheduled start time of trip) progression point to which the user is likely to get to before departing is episode 9. The media guidance application accesses user viewing history (e.g., user viewing pattern, unfinished VOD media assets or previously stored media assets, and/or the like). For example, as shown in FIG. 1, the consumption pattern chart 103 is based on the watching history of the user associated with the consumption device. The consumption pattern chart 103 illustrates that the user consumes the estimated consumption time over the number of days. If the media guidance application identifies the first progression point ("Yes" at 704), then, at 706, the media guidance application identifies a second progression point in the respective media asset of the plurality of media assets by the scheduled trip end time. If, on the other hand, the media guidance application does not identify the first progression point ("No" at 702), then the optimization step ends. Returning to 706, if the media guidance application identifies a second progression point by the scheduled trip end time ("Yes" at 706), then at 708, the media guidance application causes the consumption device to store the respective media assets that fall between the first and second progression point. On the other hand, if the media guidance application does not identify a second progression point by the scheduled trip end time ("No" at 706), then the optimization step ends.

Continuing at 710, at a point before departing for the trip, which can be a day, or an hour or another time when the consumer device is within a network connection, the media guidance application determines whether the current progression point matches the first progression point as initially predicted and as the basis for downloading episodes of the media asset, in order to optimize the amount of content downloaded for the scheduled trip based on the progress of consuming the programming. For example, the media guidance application may determine that the user has reached the predicted point in the series to continue watching the series when at the destination of the scheduled trip. For example, if the media guidance application determines that the last episode consumed (heard, watched, read) is the episode that was predicted to be completed ("Yes" at 710), then the optimization step ends and the media guidance application continues without making any adjustments to the stored media assets. If, on the other hand, the media guidance application determines that the last episode consumed (current progression point of media assets heard, watched, read)

is greater or less than the episode that was predicted (first progression point) to be completed ("No" at 710), then at 712, the media guidance application causes to store the respective media assets from the plurality of media assets between the current progression point and second progression point. For example, the media guidance application adjusts the media assets stored on the device based on the difference between the first progression point and the current progression point. For example, when the user is ahead of schedule, the media guidance application deletes media assets already consumed and downloads additional upcoming media assets episodes of the series or the watch list. In another example, the device deletes three episodes the user has seen and downloads equivalent episodes sequentially following the episodes already downloaded. On the other hand, when the user is behind schedule, the media guidance application deletes media assets from the end of the downloaded episodes of the series or the watch list and downloads additional media assets up to the last episode consumed. In another example, the device deletes the last three episodes in the sequence to free up space and downloads three episodes from the front end of the list sequentially following the episodes already consumed by the user.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4, 5 could be used to perform one or more of the steps in FIG. 7.

FIG. 8 is a flowchart of a detailed illustrative process for adjusting the stored content based on the progression point, in accordance with some embodiments of the disclosure. It should be noted that process 800 or any step thereof could be performed on, or provided by, any of the devices shown in FIGS. 2-5. For example, process 800 may be executed by control circuitry 412 (FIG. 4) as instructed by a media guidance application implemented on a user device (e.g., user equipment devices 514, 516, and/or 522 (FIG. 5)) in order to optimize the amount of content to download for a trip based on the progress of consuming the programming. In addition, one or more steps of process 800 may be incorporated into or combined with one or more steps of any other process or embodiment (e.g., as described in relation to FIGS. 7-9)).

At step 802, the media guidance application, before the user departs for the trip, determines the current progression point of the media assets on the consumption device. For example, the media guidance application checks how far in the series "Friends" the consumer is up to. In some embodiments, the media assets are a collection of movies added to a watchlist that the user plans to watch, and the progress is the movies the user has watched, for example, when the user added five movies to the watchlist and has watched three of the movies before departing for the scheduled trip.

At step 804, the media guidance application compares the current progression point of media assets (i.e., number of media assets the consumer has consumed (e.g., watched, heard, read)) and the first progression point to determine if the progression points match. For example, if the media guidance application determines that the last episode consumed is the episode that was predicted to be completed ("Yes" at 804), then the media guidance application continues without making any adjustments to the stored media asset. If, on the other hand, the media guidance application determines that the last episode consumed is greater than the episode that was predicted to be completed ("No" at 804), then at 806, the media guidance application adjusts or causes to adjust the media assets that are stored on the consumption device. For example, the media guidance application causes to be stored the respective media assets from the plurality of media assets between the current progression point and second progression point on the consumption device. For example, when the user is ahead of schedule, the media guidance application deletes media assets already consumed and downloads additional media assets on the back end of the series or the watch list. For example, the device deletes three episodes the user has seen and downloads equivalent episodes sequentially following the episodes already downloaded. Furthermore, in some embodiments, the media guidance application may perform the comparison (and/or any determinations) prior to the scheduled start time of the scheduled trip. Alternatively or additionally, the media guidance application may continually monitor the progress of the user to inform him or her of whether or not he or she will finish the media asset (or whether the unconsumed portion will need to be consumed later or on a different device) before departing for the scheduled trip. In some embodiments, a portion of the media asset, corresponding to the unconsumed content remaining in the media asset, is available for download to a second device to be shared to free up space for additional media assets to be downloaded. For example, in response to determining that the user may not be able to consume the entirety of the media asset, the media guidance application may allow the user to access the unconsumed portion on a second device. In some embodiments, the indication may be simultaneously displayed with the media listing (e.g., in order to prompt the user to select the media asset for playback as discussed above).

In some embodiments, the media guidance application may authorize another device to access a copy of the media asset, currently being consumed by the user and stored at a particular repository. In such cases, the media guidance application may authorize the other device to access the copy of the media asset at one time. Alternatively or additionally, the media guidance application may create a copy of the media asset, or a portion of the media asset, for continued viewing on another device.

In some embodiments, the media guidance application may, in response to a user selection of the indication, a subsequent user request, and/or the end of a period of accessibility, extract the portion of the media asset that is not consumed and transmit (e.g., to another component of the device upon which the media guidance application is implemented, to the second device, and/or to a third device (e.g., a web server) an instruction to create a new media asset featuring only the portion of the media asset. For example, the new media asset may then be available for download to the second device (e.g., from the web server).

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIG. 8.

FIG. 9 is a flowchart representing an illustrative process 900 for alerting a user to the availability of a series for a scheduled trip in accordance with some embodiments of the disclosure. Process 900 may be implemented on control circuitry 412. In addition, one or more actions of process 900 may be incorporated into or combined with one or more actions of any other process or embodiment described herein.

Sometimes users can "binge-watch" an entire series in a single sitting or over only a few days. In some cases, the user may begin binge-watching a series without knowing that the series will be unavailable at a destination the user is scheduled to travel to during a particular time. At 902, the media guidance application determines if the user is watching an episode of a series. The media guidance application accesses metadata corresponding to the media asset currently being consumed on the consumption device on which the optimization module 408 is employed. Suppose the user is watching an episode of a series ("Yes" at 902). In that case, at 904, the media guidance application determines whether the series will be available at the destination during the particular period of time where the user has a scheduled trip. If, on the other hand, the user is not watching an episode of a series ("No" at 902), then the media guidance application ends process 900. Returning to 904, if the series will be available at the destination during the particular time period ("Yes" at 904) then the media guidance application ends process 900. On the other hand, if the series will not be available at the destination during the particular time period ("No" at 904), then at 906, the media guidance application determines the total duration of the remaining episodes in the series. The media guidance application (e.g., via control circuitry 412) queries the platform for runtime data for all episodes of the series which come after the episode currently being watched. In some cases, only one season of the series may be unavailable at the destination of the scheduled trip during the particular time period. Suppose the episode currently being watched is an episode of the season that will be unavailable at the destination of the scheduled trip during the particular time period. In that case, the media guidance application queries the platform for runtime data for all episodes of that season of the series that come after the episode currently being watched. The media guidance application adds the runtime of each of the remaining episodes together to determine the total duration of all remaining episodes that will be stored on the consumption device.

At 908, the media guidance application determines whether the total duration of the remaining episodes downloaded is less than the difference between the first and second progression points as determined above. The media guidance application compares the length of duration that was predicted based on where in the progression the user would be before the trip and after the trip with the total duration of the remaining episodes to determine whether the user will have sufficient episodes to watch during the particular time period of the scheduled trip. A total duration that is less than the length of the particular time period ("Yes" at 908) (progression point from the start of the trip to progression point at the end of the trip) indicates at 910 that the user can store and watch all the remaining episodes during transit or on vacation. On the other hand, a total duration that is greater than the length of the particular time period ("No" at 908) (progression point from the start of the trip to progression point at the end of the trip) indicates at 912 that the media guidance application should determine the number of episodes that would last the duration of time between the first and second progression point. For example, the control circuitry determines that based on the difference in first and second progression points in a series, the user will consume 4 hours of media assets or eight half-hour episodes. Based on determining that the user will finish 4 hours' worth of media assets or eight half-hour episodes, the control circuitry stores the determined number of episodes, for example, eight episodes, to avoid over downloading content and instead download an optimized amount for the user to consume on the scheduled trip.

In some embodiments, the control circuitry 412 generates for display an alert to the user that the series will be available at the destination during the particular time period. This allows the user to free up space on the consumption device and watch the episodes during the particular time period.

The actions and descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
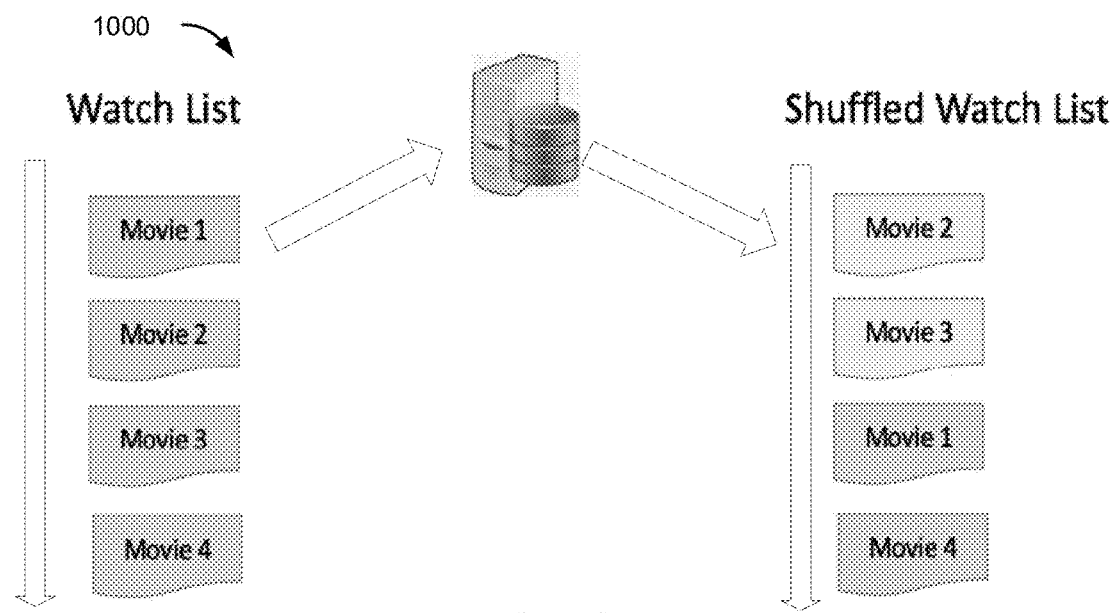
FIG. 10 depicts an illustrative example of optimizing the media assets for consumption on the user device based on the scheduled trip by reshuffling the priority, in accordance with some embodiments of the present disclosure.

FIG. 10 depicts an illustrative example of optimizing the media assets for consumption on the user device based on the scheduled trip by reshuffling the priority, in accordance with some embodiments of the present disclosure. FIG. 10 provides a consumer watch list, which may be user input or generated based on the recommendation from the system. The watch list includes movie 1, movie 2, movie 3 and movie 4. Based on identifying the scheduled trip to a destination where movies 2 and movie 3 are not permitted due to access restrictions, the system may automatically reshuffle the order in which the movies are scheduled to be consumed by moving movies 2 and 3 to the beginning of the order to allow the user to consume them before departing for his or her scheduled trip.

Figure 11:
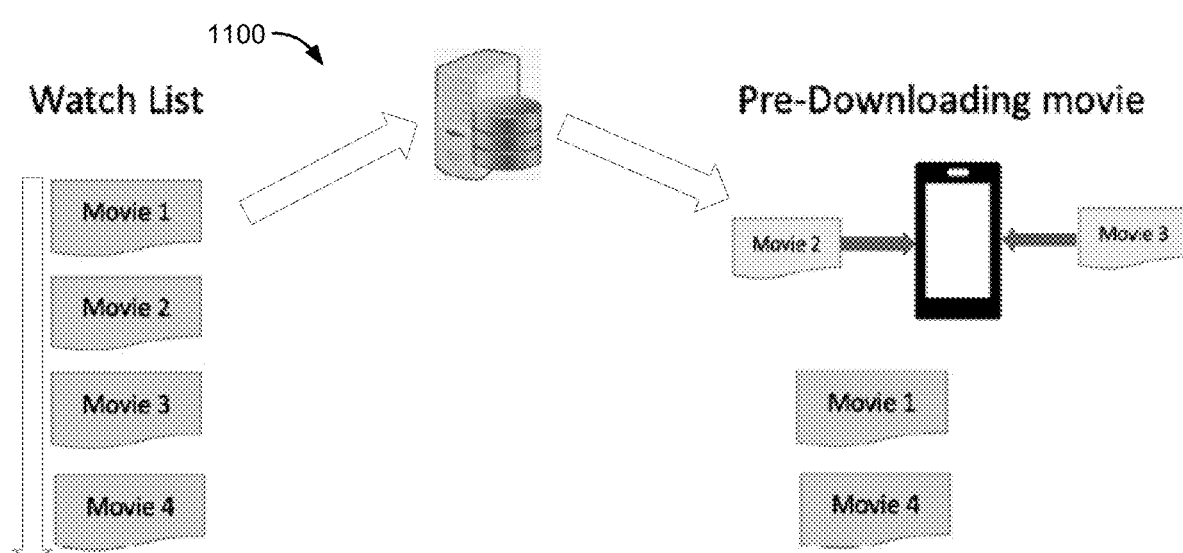
FIG. 11 depicts an illustrative example of optimizing the media assets for consumption on the user device based on the scheduled trip by pre-downloading, in accordance with some embodiments of the present disclosure.

FIG. 11 depicts an illustrative example of optimizing the media assets for consumption on the user device based on the scheduled trip by pre-downloading, in accordance with some embodiments of the present disclosure. FIG. 11 provides a consumer watch list, which may be generated as discussed above or any other way to generate a list of content for the user to consume. The watch list includes movie 1, movie 2, movie 3 and movie 4. Based on identifying the scheduled trip to a destination where movies 2 and movie 3 are not permitted due to access restrictions, the system may automatically download to the consumption device the movies 2 and 3 to permit the user to consume the movies during the scheduled trip.

As used herein, "a user interface application" refers to a form of content through an interface that facilitates access to audio, music, news and podcast content on one or more display devices operating on any capable device. In some embodiments, the user interface application may be provided as an online application (i.e., provided on a website) or as a stand-alone application on a server, user device, etc. The user interface application may also communicate with an antenna array or telematics array to receive content via a network. Various devices and platforms that may implement the user interface application are described in more detail below. In some embodiments, the user interface application and/or any instructions for performing any of the embodiments discussed herein may be encoded on computer-readable media. Computer-readable media includes any media capable of storing instructions and/or data. The computer-readable media may be transitory, including, but not limited to, propagating electrical or electromagnetic signals, or may be non-transitory, including, but not limited to, volatile and nonvolatile computer memory or storage devices such as a hard disk, floppy disk, USB drive, DVD, CD, media card, register memory, processor caches, random access memory (RAM), etc.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, webcasts, etc.), a collection of episodes in a series, a single episode in a series, video clips, audio, content information, pictures, rotating images, documents, playlists, websites, articles, books, electronic books, blogs, advertisements, chat sessions, social media, chat rooms, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A method comprising:
   storing, in local memory at a media device, a plurality of media assets based on data about a scheduled trip;
   within a threshold time period prior to the scheduled trip:
   retrieving, from a user profile, a consumption pattern;
   determining, based on the consumption pattern and the data about the scheduled trip, an expected progression amount of the plurality of media assets to be consumed during the scheduled trip; and
   automatically modifying the plurality of media assets to store, in the local memory, media assets of the plurality of media assets matching the expected progression amount.

2. The method of claim 1, further comprising:
   determining a consumption order of the stored media assets; and
   rearranging the stored media assets to prioritize consumption of the stored media assets in the consumption order during the scheduled trip.

3. The method of claim 1, wherein storing, in the local memory at the media device, the plurality of media assets based on the data about the scheduled trip comprises:
   identifying one or more media assets that are unavailable from a remote content source during the scheduled trip; and
   storing, in the local memory, the one or more media assets.

4. The method of claim 1, wherein retrieving, from the user profile, the consumption pattern comprises:
   identifying a travel media asset consumption pattern based on one or more previous trips; and
   wherein the consumption pattern is at least partially based on the travel media asset consumption pattern.

5. The method of claim 1, wherein retrieving, from the user profile, the consumption pattern comprises:
   identifying, from the consumption pattern, a travel consumption pattern based on a previous trip;
   identifying, from the consumption pattern, a non-travel consumption pattern;
   weighting the travel consumption pattern and the non-travel consumption pattern based on a length of time between the previous trip and the scheduled trip; and
   determining, based on the weighting, a travel consumption rate and a non-travel consumption rate, a consumption rate.

6. The method of claim 5, wherein the expected progression amount is determined at least partially based on the consumption rate.

7. The method of claim 1, wherein the plurality of media assets comprises one or more media assets from a watchlist.

8. The method of claim 1, further comprising:
   determining that the data about the scheduled trip indicates a plurality of users on the scheduled trip;
   determining a joint consumption pattern for the plurality of users; and
   wherein storing, in the local memory at the media device, the plurality of media assets further comprises storing one or more media assets based on the joint consumption pattern.

9. The method of claim 1, wherein storing the plurality of media assets comprises downloading one or more media assets from a media streaming service.

10. The method of claim 1, further comprising:
    generating a content recommendation indicating one or more media assets for consumption during the scheduled trip.

11. The method of claim 1, wherein the data about the scheduled trip comprises at least one of calendar data, electronic communication data, travel information data, or indicators of travel accommodations during the scheduled trip.

12. A system comprising:
    storage circuitry configured to store one or more media assets in local memory at a media device; and
    control circuitry configured to:
    store, in the local memory via the storage circuitry, a plurality of media assets based on data about a scheduled trip;
    within a threshold time period prior to the scheduled trip:
    retrieve, from a user profile, a consumption pattern;
    determine, based on the consumption pattern and the data about the scheduled trip, an expected progression amount to be consumed from the plurality of media assets during the scheduled trip; and
    automatically modify the plurality of media assets to store, in the local memory via the storage circuitry, media assets of the plurality of media assets matching the expected progression amount.

13. The system of claim 12, wherein the control circuitry is further configured to:

determine a consumption order of the stored media assets; and rearrange the stored media assets to prioritize consumption of the stored media assets in the consumption order during the scheduled trip.

14. The system of claim 12, wherein the control circuitry, when storing, in the local memory, the plurality of media assets based on the data about the scheduled trip, is configured to:

identify one or more media assets that are unavailable from a remote content source during the scheduled trip; and store, in the local memory, the one or more media assets.

15. The system of claim 12, wherein the control circuitry, when retrieving, from the user profile, the consumption pattern, is configured to:

identify a travel media asset consumption pattern based on one or more previous trips, wherein the consumption pattern is at least partially based on the travel media asset consumption pattern.

16. The system of claim 12, wherein the control circuitry, when retrieving, from the user profile, the consumption pattern, is configured to:

identify, from the consumption pattern, a travel consumption pattern based on a previous trip;

identify, from the consumption pattern, a non-travel consumption pattern;

weight the travel consumption pattern and the non-travel consumption pattern based on a length of time between the previous trip and the scheduled trip; and determine, based on the weighting, a travel consumption rate and a non-travel consumption rate, a consumption rate.

17. The system of claim 16, wherein the control circuitry is configured to determine the expected progression amount at least partially based on the consumption rate.

18. The system of claim 12, wherein the plurality of media assets comprises one or more media assets from a watchlist.

19. The system of claim 12, wherein the control circuitry is further configured to:

determine that the data about the scheduled trip indicates a plurality of users on the scheduled trip;

determine a joint consumption pattern for the plurality of users; and wherein the control circuitry is further configured to store one or more media assets based on the joint consumption pattern.

20. The system of claim 12, wherein the data about the scheduled trip comprises at least one of calendar data, electronic communication data, travel information data, or indicators of travel accommodations during the scheduled trip.

* * * * *